United States Patent [19]

Gallup et al.

[11] Patent Number: 4,978,457

[45] Date of Patent: Dec. 18, 1990

[54] METHOD OF FILTERING A BRINE

[75] Inventors: Darrell L. Gallup, Chino; John L. Featherstone, El Centro, both of Calif.

[73] Assignee: Union Oil Company of California, Los Angeles, Calif.

[21] Appl. No.: 485,123

[22] Filed: Feb. 26, 1990

[51] Int. Cl.$^5$ ............................................. B01D 29/66
[52] U.S. Cl. ................................... 210/747; 210/758; 210/791; 60/641.5; 60/646
[58] Field of Search ............... 210/747, 749, 758, 759, 210/791, 797, 696; 60/641.5, 646

[56]  References Cited

U.S. PATENT DOCUMENTS

| | | | |
|---|---|---|---|
| 4,370,858 | 2/1983 | Awerbuch et al. | 210/747 |
| 4,420,938 | 12/1983 | Lieffers | 60/641.5 |
| 4,500,434 | 2/1985 | Jost et al. | 210/696 |
| 4,522,728 | 6/1985 | Gallup et al. | 210/718 |
| 4,537,684 | 8/1985 | Gallup et al. | 210/696 |
| 4,615,808 | 10/1986 | Gallup et al. | 210/718 |
| 4,761,182 | 8/1988 | Whitescarver et al. | 210/751 |

*Primary Examiner*—Richard V. Fisher
*Assistant Examiner*—Neil McCarthy
*Attorney, Agent, or Firm*—Gregory F. Wirzbicki; Clark E. DeLarvin

[57] ABSTRACT

Condensate of steam derived from a geothermal brine is treated to enhance its utility as wash water for a brine filter. The condensate is sprayed into a tank in the presence of air to effect substantial oxidation of oxidizable sulfur species contained therein, and the pH of the condensate is adjusted to be within about 1.0 pH units of the pH of the brine. Such treatment substantially extends the life of the filter media used in the brine filter.

25 Claims, No Drawings

METHOD OF FILTERING A BRINE

The present invention broadly relates to the filtration of a geothermal brine. It particularly relates to a method of treating a condensate of steam, derived from a geothermal brine, for use as wash water for a brine filter.

BACKGROUND DISCUSSION

General processes by which geothermal fluids can be used to generate electric power are known and have been known for some time. Naturally pressurized geothermal brine having a temperature of over about 400° F. can be flashed to a reduced pressure to convert some of the brine or water to steam. The steam produced in this manner can then be used to drive steam turbine generators. The flashed geothermal liquid and the steam condensate obtained from power generation are typically reinjected into the ground to replenish the aquifer and prevent ground subsidence.

Although, as above mentioned, general processes are known for using geothermal brine or water for production of electric power, serious problems, especially with the use of highly saline geothermal brine, have often been encountered in practice. These problems have frequently been so great as to prevent the production of electric power at competitive rates and, as a consequence, have greatly impeded the progress of flashed geothermal brine power plant development in many areas.

These severe problems are caused primarily by the complex composition of geothermal brines. At natural aquifer temperatures in excess of about 400° F. and pressures in the typical range of from 400 to 500 psig, the brine leaches large amounts of salts, minerals and elements from the aquifer formation. Thus, although brine composition may vary from aquifer to aquifer, wellhead brine typically contains very high levels of dissolved silica, as well as substantial levels of dissolved heavy metals such as lead, copper, zinc, iron and cadmium. In addition, many other impurities, particulate matter and dissolved gases are present in most geothermal brines.

As the natural brine pressure and temperature are substantially reduced in power plant steam production (flashing) stages, chemical equilibrium of the brine is disturbed and saturation levels of impurities in the brine are typically exceeded. This causes impurities and silica to precipitate from the brine, as a tough scale, onto surrounding equipment walls and in reinjection wells, often at a rate of several inches in thickness per month. Assuming, as is common, that the brine is supersaturated with silica at the wellhead, in high temperature portions of the brine handling system, for example, in the high pressure brine flashing vessels, heavy metal sulfide and silicate scaling typically predominates. In lower temperature portions of the system, for example, in atmospheric flashing vessels, amorphous silica and hydrated ferric oxide scaling has been found to predominate. Scale, so formed, typically comprises iron-rich silicates, and is usually very difficult, costly and time consuming to remove from equipment. Because of the fast growing scale rates, extensive facility down time for descaling operations may be required, unless scale reducing processes are used. Associated injection wells may also require frequent and extensive rework and new injection wells may, from time to time, have to be drilled at great cost.

Therefore, considerable effort has been, and is being, directed towards developing effective processes for eliminating, or at least very substantially reducing, silica scaling in flashed geothermal brine handling systems. One such scale reduction process disclosed in U.S Pat. No. 4,370,858 to Awerbuck, et al, involves the induced precipitation of scale-forming materials, notably silica, from the brine in the flashing stage by contacting the flashed brine with silica or silica-rich seed crystals. When the amount of silica which can remain in the brine is exceeded by the brine being flashed to a reduced pressure, silica leaving solution in the brine deposits onto the seed crystals. Not only do the vast number of micron-sized seed crystals introduced into the flashing stage provide a very much larger surface area than the exposed surfaces of the flashing vessels, but also the silica from the brine tends, for chemical reasons, to preferentially deposit onto the seed crystals. Substantially all of the silica precipitating from the brine precipitates onto the seed crystals instead of precipitating as scale onto vessel and equipment walls.

To protect the injection wells from plugging by the substantial quantity of precipitate contained in the brine, it is customary to provide a brine clarification stage. Generally the brine clarification stage comprises at least one clarifier vessel into which the brine is introduced to permit the precipitate to settle therefrom. A clarified brine overflow is introduced into a filtering stage and then subsequently introduced into the reinjection well. The precipitate (sludge) from the clarifier is removed and dewatered, generally through the use of a filter press. The amount of such sludge requiring disposal is substantial. For example, a 50 megawatt power plant which requires a brine flow rate of about 5 million pounds an hour will produce approximately 30 tons of sludge per day.

A typical filter press comprises an alternate assembly of plates covered on both sides with a filter medium, usually a cloth, and hollow frames that provide space for cake accumulation during filtration. Generally the frames have feed and wash manifold ports, and the plates have filtrate drainage ports. The plates and frames are pressed together during filtration to form a water tight closure between two end plates, one of which is stationary. The press may be closed manually, hydraulically or by a motor drive. A variety of feed and filtrate discharge arrangements are available. The filter press has the advantage of simplicity, low capital cost and flexibility. The filter capacity is readily varied by adding or removing plates and frames. A disadvantage of the filter press is the relatively short filter-cloth life due to the mechanical wear of emptying and cleaning the press (often involving scraping the cloth) and high labor costs.

During the silica crystallization process, many other materials precipitate from the brine onto the seed material along with the silica. Thus, although the sludge referred to above comprises mostly silica, it will also contain significant amounts of other materials such as barite, arsenic and heavy metals including lead, copper and zinc which, above specific levels of concentration, may be considered as toxic and require disposal in a toxic waste dump. It will be appreciated that the cost of disposal of such large amounts of sludge in a toxic disposal site would be substantial. Further, the cost can be expected to increase as larger geothermal brine power plants are constructed (with the attendant increase in the quantity of sludge produced), as allowable concentrations of heavy metals in the sludge are reduced by governmental regulations and as the number of toxic waste dumps decrease or become more remotely located. Even if the sludge is non-toxic, the sheer volume involved makes its disposal costly.

It has been suggested to use the geothermal sludge to make a concrete-like material which can be used for construction purposes. The sludge contained in a filter press is washed, and the washed sludge is combined with a portland type cement and an activating media to produce a structural concrete material. A condensate of steam, derived from the geothermal brine being processed, may be used as a wash water for the sludge contained in the filter press. It has been found that the cloth, comprising the filter media of the filter press, requires replacement at about one week intervals at a substantial cost.

It is an object of the invention to provide a method of treating a steam condensate derived from geothermal brine to enhance its utility as a wash water for a brine filter.

It is another object of the invention to provide a means for extending the life of a filter media used for removing water from a brine precipitate.

SUMMARY OF THE INVENTION

The present invention provides a method for treating a brine filter using as a wash water a treated condensate of steam derived from a sulfur-containing brine. Broadly, the method comprises exposing the condensate to an oxidant to effect oxidation of a substantial portion of any reduced sulfur constituents contained therein. The pH of the condensate is then adjusted to be within about 1.0 pH units of the pH of the filtered brine. It has been found that when the condensate is treated as above described the life of the filter media is extended by a factor of at least 6 and generally by a factor of from about 12 to 20 over that which would be obtained with untreated condensate. This and other advantages of the invention will be more apparent from the following detailed description.

DESCRIPTION OF A PREFERRED EMBODIMENT

For the purpose of illustration, the present invention will be described with respect to what is now considered its most preferred application, namely, the treatment of a condensate of steam derived from a geothermal brine to enhance its utility as a wash water for a brine condensate. The present condensate treatment method can be better understood by first considering an exemplary geothermal brine electrical power plant. Geothermal brine is withdrawn from an underground aquifer through an extraction well. At the wellhead the geothermal brine contains both liquid and vapor phases and typically will have a temperature of from about 400° F. to about 600° F. and be at a pressure of from about 250 psig to about 500 psig. For example, a typical Salton Sea wellhead temperature and pressure are about 450.F and 450 psig, respectively. Geothermal brines typically contain substantial amounts of dissolved minerals and elements from the aquifer formation. In particularly, the brine normally contains considerable dissolved salts (hence, the term "brine") and is typically saturated with silica. In addition, the brine as extracted may contain appreciable amounts of dissolved elements such as lead, zinc, copper, iron, cadmium, silver, manganese, arsenic and antimony. Gases such as hydrogen sulfide, ammonia and carbon dioxide are frequently intermixed with the brine. Thus, geothermal brines ordinarily comprise heavily contaminated water and typically have a wellhead pH of from about 5 to 6.

For a more detailed description of a typical geothermal brine process for which the process of the present invention is especially suited, see U.S. Pat. No. 4,761,182 issued Aug. 2, 1988, which is incorporated herein by reference in its entirety.

The brine from the wellhead is introduced into a zone of reduced pressure (flashed) to produce two phases, a gas phase and a liquid phase. The gas phase principally comprises steam along with a minor amount of non-condensible gases which are passed through a steam turbine to drive a generator and produce electric power. The effluent steam from the turbine is introduced into a condenser in which at least some of the steam is condensed to form a condensate. The condensate is circulated through at least one open cooling tower to reduce its temperature for use as cooling water in the condenser.

The liquid phase, referred to as the rejected brine, may be passed through one or more additional zones of reduced pressure to produce additional steam. Under ideal circumstances, the condensate and the rejected brine ultimately are disposed of by reinjection into a well.

To protect the injection well, the rejected brine is usually processed to remove entrained solids. Typically this would comprise a brine clarification stage which would include a recirculation type clarifier, a thickener and a filter press. The brine is introduced into the clarifier and an overflow stream of brine is filtered and returned to the injection well. A bottom portion, containing a high concentrations of solids, is introduced into the thickener and overflow from the thickener principally comprising brine also is filtered and returned to the injection well. The underflow from the thickener is passed through a filter press to produce a solid filter cake for disposal and a brine stream which also is filtered prior to being returned to the injection well. The operation of the filter press is cyclic, the brine is introduced into the filter press continuously for a predetermined time and then the flow of brine is diverted. The filter cake collected in the filter press is washed with condensate to remove entrained brine. Thereafter the filter press is opened and the filter cake is removed. Typically the washing and filter cake removal would take approximately 2½ minutes, and the filter press will go through approximately 30 cycles per day.

A problem, encountered in the operation of the filter press, is the necessity of replacing the cloth filter media at relatively short intervals of time.

The present inventors have found that the rapid deterioration of the filter media is the result of certain reactions between the condensate, used as wash water, and the brine. More particularly it was discovered that hard scale deposits of metal sulfides, oxides and carbonates form on the filter media thus shortening its useful life.

In accordance with the present invention, these problems are substantially mitigated by pretreating the condensate prior to using it as a wash water. The pretreatment involves subjecting the condensate to oxidation. Typically a side stream of condensate from the condenser is sprayed into a holding tank in the presence of air to effect air oxidation of substantially all the sulfite and sulfide contained therein to sulfate. Preferably the tank is open to the atmosphere to further enhance the air oxidation of the sulfite and sulfide species present.

The present inventors have found that the presence of sulfite, sulfide or both causes precipitation of heavy metals in the filter press which form a hard scale on the filter media. The total concentration of oxidizable sulfur species of the condensate will vary considerably depending on the source of the brine. For brines from geothermal formations in the Salton Sea, the typical concentration varies from as little as 20 ppm up to as high as 60 ppm or more. A typical concentration range of oxidizable sulfur species is from about 30 to 40 ppm. Accordingly, the condensate is exposed to an oxidant for a sufficient time period to oxidize at least 80%, preferably at least 90%, and even more preferably at least 95% of the sulfite and sulfide to sulfate.

The desired oxidation may be accomplished in one or more ways. One way to accomplish the desired oxidation is to provide a tank having a volume such that the holding time of the condensate in the tank will be sufficient to achieve the desired degree of oxidation. Another way would be to provide for recirculation of the condensate through the spray nozzles to increase the air contact with the condensate. Still another way is to add an oxidizing agent to the condensate, this being particularly effective when substantially complete oxidation is desired.

The condensate, either concurrently with the air oxidation or thereafter, is treated with an acid to reduce its pH. Any acid may be utilized though some are preferred over others. More particularly, sulfuric and nitric acids are least preferred since their salts introduce new variables into the already complex nature of the condensate and brine. The most preferred acid is hydrochloric, acetic and acetic acid derivatives. The most preferred acid is hydrochloric acid, based on its availability, cost and compatibility with both the condensate and the brine.

The present inventors have found, when the pH of the condensate is adjusted to closely approximate that of the brine, the hard scale formation on the filter media of the filter press is substantially reduced. Thus, the life of the filter media is substantially extended. Typically the pH of the condensate will be adjusted to be within about 1, preferably about 0.75 and even more preferably 0.5 pH units of that of the brine being filtered. In a typical system the pH of the brine will be within the range of from about 5 to 6 and that of the condensate will be about 9. In such instance, the pH of the condensate would be reduced to about 6 and preferably about 5.5.

This example demonstrates the application of the present invention to a Salton Sea geothermal brine processing facility in which the geothermal brine is utilized for the production of electrical power. The underflow from a clarifier and thickener (previously described) is introduced into a filter press. After approximately 5500 pounds of slurry have been processed, producing a filtrate for reinjection into an injection well and a filter cake contained in the filter press, the operation is halted, and the filter press is purged with steam condensate in an amount of about 500 gallons. Thereafter, the press is opened, and the filter cake removed for disposal or use in forming a construction material such as geocrete (a filter cake-cement mixture). When using untreated condensate as suggested by the prior art, the filter media of the filter press requires replacement at approximately 1 week intervals. This equates to an annular cost of approximately $163,000.

When the filter press is washed with condensate treated in accordance with the present invention, the life of the filter media is extended to over 3 months. Thus, utilizing treated condensate the annual costs for the filter media is reduced to only about $38,000 per year, representing a net savings of approximately $125,000 annually. Further even when the cost of the acid is taken into consideration, the net savings is still in excess of about $120,000 per year. Still further, it will be appreciated that this savings does not include the substantial savings in labor costs. Accordingly, this example clearly demonstrates the efficacy and advantage of the present invention.

Although a particular preferred embodiment of the invention has been described for purpose of illustrating the manner in which the invention can be used to advantage, it will be understood that the invention is not so limited since many obvious modifications can be made. Accordingly, it is intended to include within this invention any such modifications that fall within the scope and spirit of the appended claims.

What is claimed is:

1. A method of extending the life of a media filter used for filtering a brine comprising, contacting a condensate of steam derived from the brine with an oxidant to oxidize a substantial portion of an oxidizable sulfur species contained therein, adjusting the pH of the condensate to be within about 1.0 pH units of the pH of the filtered brine, and using the treated condensate as a wash water for the filter.

2. The method of claim 1 wherein the condensate is oxidized by aeration.

3. The method of claim 1 wherein the oxidizable sulfur species is selected from the group consisting of sulfide and sulfite.

4. The method of claim 3 wherein at least 80% of the sulfur species are oxidized to sulfate.

5. The method of claim 1 wherein the pH of the condensate is adjusted to be within about 0.5 pH units of the brine.

6. The method of claim 5 wherein the pH of the condensate is adjusted by the addition thereto of an acid.

7. The method of claim 6 wherein the acid is selected from the group consisting of hydrochloric acid, acetic acid and acetic acid derivatives.

8. The method of claim 6 wherein the acid is hydrochloric acid.

9. The method of claim 6 wherein the brine has a pH within the range of from about 5.0 to about 6.0 and the pH of the condensate is adjusted to about 5.5.

10. The method of claim 9 wherein the acid is hydrochloric acid.

11. A method of treating a condensate of steam derived from a geothermal brine to enhance its use as a wash water for a geothermal brine filter containing a filter media, filter cake and entrained brine, said condensate containing oxidizable sulfur species, said method comprising: oxidizing the condensate to oxidize a substantial portion of said sulfur species contained therein and adjusting the pH of the condensate to be within about 1.0 pH units of the pH of the brine and washing the filter media and filter cake with the treated condensate to remove entrained brine therefrom.

12. The method of claim 8 wherein the pH of the condensate is adjusted to be within about 0.75 pH units of the brine.

13. The method of claim 11 wherein the pH of the condensate is adjusted by the addition thereto of an acid.

14. The method of claim 13 wherein the acid is selected from the group consisting of hydrochloric acid, acetic acid and acetic acid derivatives.

15. The method of claim 13 wherein the acid is hydrochloric acid.

16. The method of claim 9 wherein the brine has a pH of from about 5.0 to 6.0 and the pH of the condensate is adjusted to about 5.5.

17. The method of claim 13 wherein the pH of the condensate is adjusted by the addition thereto of hydrochloric acid.

18. A process comprising: introducing a geothermal brine containing at least one sulfur species selected from the group consisting of sulfite and sulfide into a zone of reduced pressure to produce a gas phase, comprising steam which is subsequently condensed to form a condensate, and a liquid phase comprising residual brine, introducing the residual brine into a clarification vessel to produce a clarified brine and a precipitate rich brine, passing the precipitate rich brine through a filter media to produce a filtrate and a filter cake containing entrained brine, spraying the condensate into a tank in the presence of air to effect air oxidation of a substantial portion of the total sulfide and sulfite species contained therein, adjusting the pH of the condensate to be within about 1.0 pH units of the pH of the entrained brine and using the treated condensate to wash the filter cake and filter media.

19. The method of claim 15 wherein the pH of the condensate is adjusted to be within about 0.5 pH units of that of the brine.

20. The method of claim 19 wherein the pH of the condensate is adjusted by the addition thereto of an acid.

21. The method of claim 20 wherein the acid is selected from the group consisting of hydrochloric acid, acetic acid and acetic acid derivatives.

22. The method of claim 20 wherein the acid is hydrochloric acid.

23. The method of claim 18 wherein the brine has a pH within the range of from about 5.0 to 6.0 and the pH of the condensate is adjusted to be about 5.5.

24. The method of claim 23 wherein the pH of the condensate is adjusted by the addition thereto of hydrochloric acid.

25. The method of claim 24 wherein at least 90% of the sulfur species are oxidized to sulfate.

* * * * *